(12) United States Patent
Duncombe et al.

(10) Patent No.: US 11,738,321 B2
(45) Date of Patent: Aug. 29, 2023

(54) LANTHANIDE-CHELATOR COMBINATORIAL BARCODING

(71) Applicants: The Regents of the University of California, Oakland, CA (US); National Technology & Engineering Solutions of Sandia, LLC, Albuquerque, NM (US)

(72) Inventors: Todd Duncombe, Oakland, CA (US); Trent R. Northen, Walnut Creek, CA (US); Kai Deng, Orinda, CA (US); Anup K. Singh, Danville, CA (US)

(73) Assignees: The Regents of the University of California, Oakland, CA (US); National Technology & Engineering Solutions Of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/611,662

(22) Filed: Jun. 1, 2017

(65) Prior Publication Data

US 2017/0348665 A1    Dec. 7, 2017

Related U.S. Application Data

(60) Provisional application No. 62/420,423, filed on Nov. 10, 2016, provisional application No. 62/344,803, filed on Jun. 2, 2016.

(51) Int. Cl.

| | |
|---|---|
| *G01N 33/58* | (2006.01) |
| *B01J 19/00* | (2006.01) |
| *C07F 5/00* | (2006.01) |
| C40B 70/00 | (2006.01) |
| C40B 20/04 | (2006.01) |
| C40B 40/04 | (2006.01) |

(52) U.S. Cl.
CPC ......... *B01J 19/0046* (2013.01); *C07F 5/003* (2013.01); *B01J 2219/00547* (2013.01); *B01J 2219/00581* (2013.01); *B01J 2219/00702* (2013.01); *C40B 20/04* (2013.01); *C40B 40/04* (2013.01); *C40B 70/00* (2013.01); *G01N 2458/40* (2013.01); *G01N 2560/00* (2013.01)

(58) Field of Classification Search
CPC ................................. G01N 33/68; C07F 5/00
See application file for complete search history.

(56) References Cited

U.S. PATENT DOCUMENTS

| | | | | |
|---|---|---|---|---|
| 5,622,821 A * | 4/1997 | Selvin | ................. | G01N 33/533 435/6.11 |
| 7,439,079 B2 * | 10/2008 | Song | ................. | G01N 33/54366 435/287.7 |
| 8,669,116 B2 * | 3/2014 | Gygi | ................. | C12Q 1/37 436/173 |
| 9,012,239 B2 * | 4/2015 | Winnik | ................. | C08F 8/42 436/528 |
| 2005/0123911 A1 * | 6/2005 | McKeown | ................. | C12Q 1/37 435/6.12 |
| 2007/0087452 A1 * | 4/2007 | Parker | ................. | C07D 403/02 436/518 |
| 2016/0243265 A1 * | 8/2016 | Port | ................. | A61K 49/06 |

OTHER PUBLICATIONS

Tenorio-Daussat et al., Peptide Labeling With Lanthanide-NHS-Ester-DOTA Investigated by Nano-HPLC, Microchemical Journal, 2014, 118, 238-241. (Year: 2014).*
Gregorius et al., Characterization of Metal-Labelled Peptides by Matrix-Assisted Laser Desorption/Ionization Mass Spectrometry and Tandem Mass Spectrometry, Rapid Communications in Mass Spectrometry, 2010, 24, 3279-3289. (Year: 2010).*
Schuerenberg et al., Prestructured MALDI-MS Sample Supports, Analytical Chemistry, 2000, 72, 3436-3442. (Year: 2000).*
Wei et al., Microscale Sample Deposition Onto Hydrophobic Target Plates For Trace Level Detection of Neuropeptides in Brain Tissue by MALDI-MS, Journal of Mass Spectrometry, 2005, 40, 1338-1346. (Year: 2005).*
Vancaeyzeele et al., Lanthanide-Containing Polymer Nanoparticles for Biological Tagging Applications: Nonspecific Endocytosis and Cell Adhesion, Journal of the American Chemical Society, 2007, 129, 13653-13660. (Year: 2007).*
Chien et al., Sample Stacking of an Extremely Large Injection Volume in High-Performance Capillary Electrophoresis, Analytical Chemistry, 1992, 64, 1046-1050. (Year: 1992).*
Choudhary et al., Sensitivity and Quantitation Using a Finnigan LCQ Deca XP Plus Ion Trap Mass Spectrometer; Thermo Electron, 2003, 1-4. (Year: 2003).*
Gregorius et al., Characterization of Metal-Labelled Peptides by Matrix-Assisted Laser Desorption/Ionization Mass Spectrometry and Tandem Mass Spectrometry, Rapid Communications in Mass Spectrometry, 2010, 24, 3279-3289 (Year: 2010).*
Steincamp et al., Detection Scheme for Bioassay Based on 2,6-Pyridinedicarboxylic acid Derivatives and Enzyme-Amplified Lanthanide Luminescence, Analytica Chimica Acta, 2004, 526, 27-34. (Year: 2004).*

(Continued)

*Primary Examiner* — Amy M Bunker
(74) *Attorney, Agent, or Firm* — Sheppard, Mullin, Richter & Hampton LLP

(57) ABSTRACT

Disclosed herein are methods for tracking solutions, (e.g., reaction conditions in solutions). In some embodiments, the method comprises: contacting a first lanthanide-chelator complex to a first solution to generate a first barcoded solution, wherein the first lanthanide-chelator complex comprises a first lanthanide chelated by a first chelator; contacting a second lanthanide-chelator complex to a second solution to generate a second barcoded solution, wherein the second lanthanide-chelator complex comprises a second lanthanide chelated by a second chelator; mixing the first barcoded solution and the second barcoded solution to form one or more mixtures; and identifying the first lanthanide ions in the mass spectrum and the second lanthanide ions in the mass spectrum to track the condition of each of the one or more mixtures.

14 Claims, 5 Drawing Sheets

(56) References Cited

OTHER PUBLICATIONS

Nicolescu, T., Interpretation of Mass Spectra, Chapter 2, Mass Spectrometry, Intech, 2017, 23-78. (Year: 2017).*
Deng et al., ICP-MS DNA Assay Based on Lanthanide Labels and Hybridization Chain Reaction Amplification, Analytical Methods, 2015, 7, 5767-5771. (Year: 2015).*
Hingorani et al., Sensing Lanthanide Metal Content in Biological Tissues with Magnetic Resonance Spectroscopy, Sensors, 2013, 13, 13732-13743. (Year: 2013).*
Deng et al., Supplementary Materials, ICP-MS DNA Assay Based on Lanthanide Labels and Hybridization Chain Reaction Amplification, Analytical Methods, 2015, 7, 1-8 (Year: 2015).*
Meija et al., Atomic Weights of the Elements 2013 (IUPAC Technical Report), Pure and Applied Chemistry, 2016, 88(3), 265-291. (Year: 2016).*
Bendall, et al., Single-cell mass cytometry of differential immune and drug responses across a human hematopoietic continuum, Science, May 6, 2011, 332:687-696.
Jeschek, et al., Rationally reduced libraries for combinatorial pathway optimization minimizing experimental effort, Nature Communications, Mar. 31, 2016, 7(11163):1-10.
Kwon, et al., High-throughput, microarray-based synthesis of natural product analogues via in vitro metabolic pathway construction, ACS Chemical Biology, May 25, 2007, 2(6):419-425.

* cited by examiner

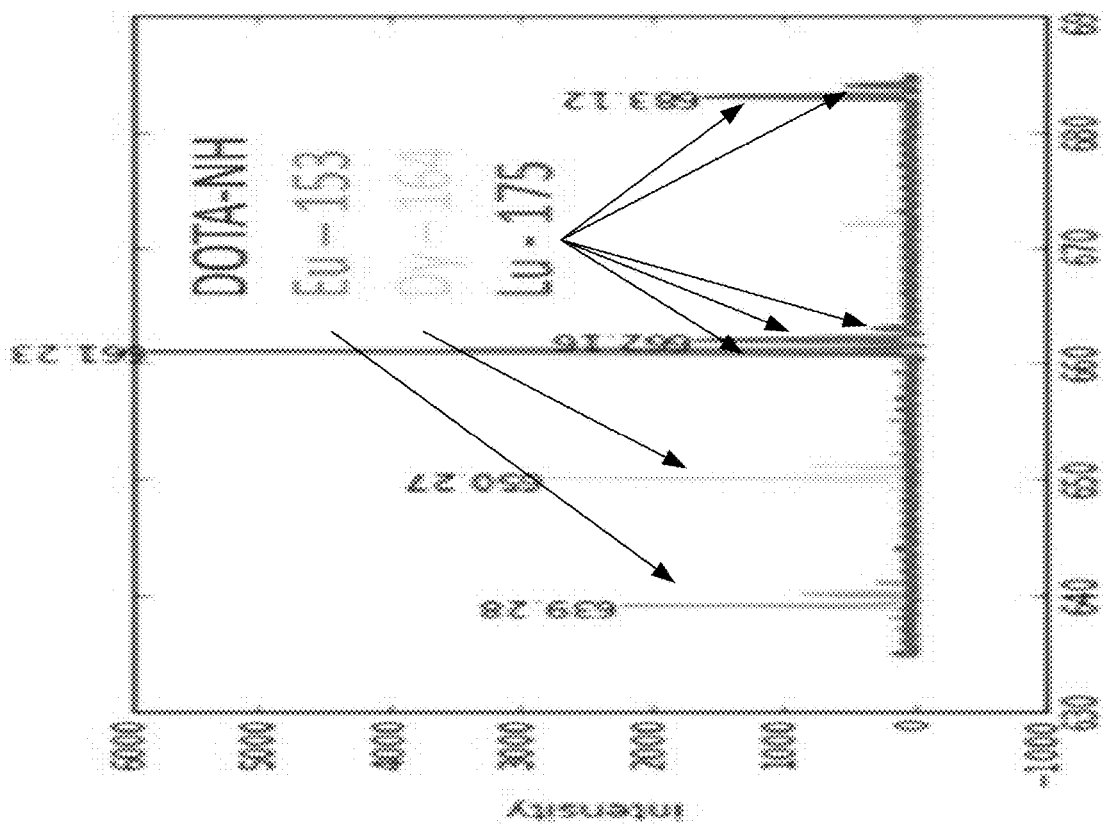
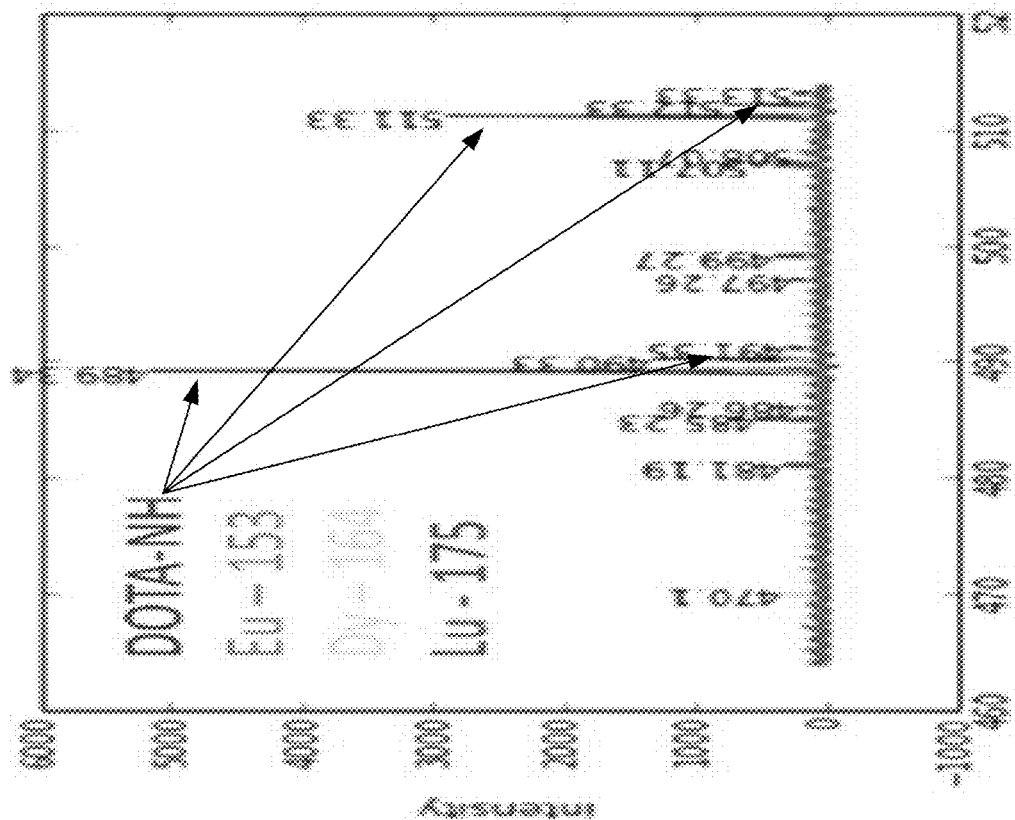
FIG. 2A
FIG. 2B

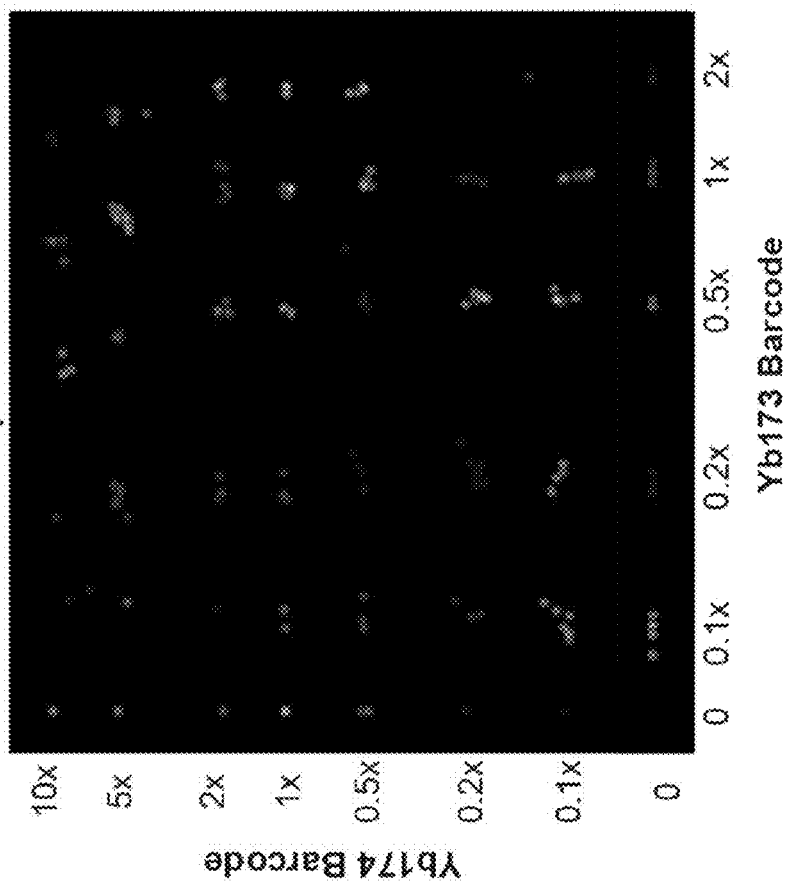
FIG. 3A
FIG. 3B
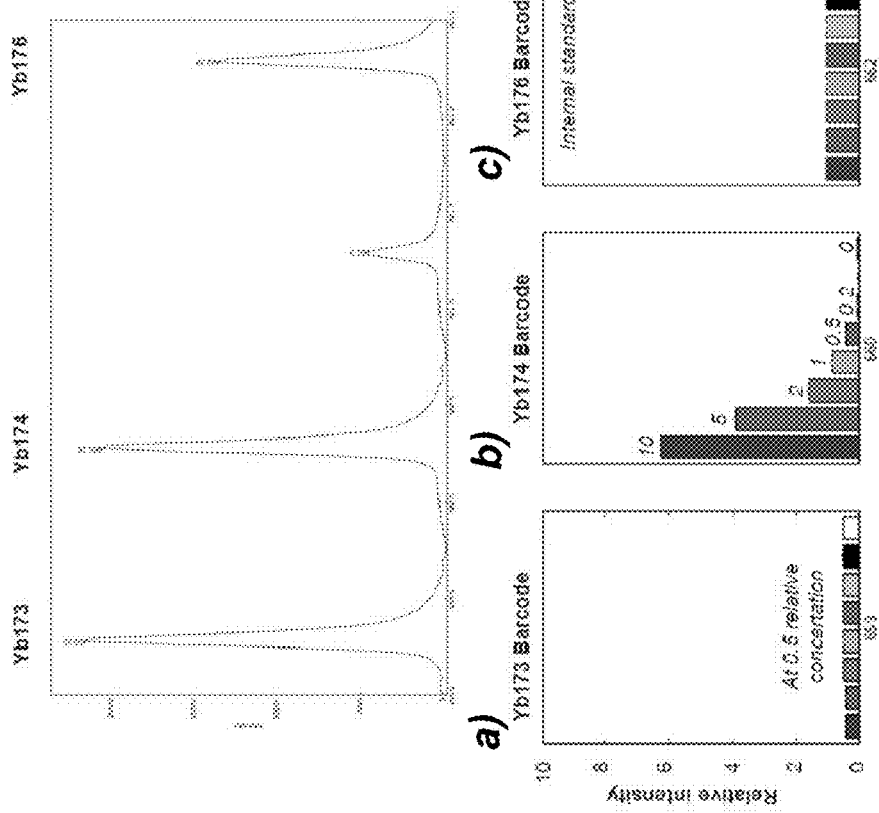
FIG. 3C ion. The government has certain rights in the invention.

LANTHANIDE-CHELATOR COMBINATORIAL BARCODING

RELATED APPLICATION

The present application claims priority under 35 U.S.C. § 119(e) to U.S. Provisional Application No. 62/344,803, filed on Jun. 2, 2016; and U.S. Provisional Application No. 62/420,423, filed on Nov. 10, 2016. The content of each of these related applications is hereby expressly incorporated by reference in its entirety.

STATEMENT REGARDING FEDERALLY SPONSORED R&D

This invention was made with government support under grant no. DE-AC02-05CH11231 awarded by the U.S. Department of Energy. The government has certain rights in the invention.

BACKGROUND

Field

The present disclosure relates generally to the field of chemical biology, and more particularly to tracking liquid solutions.

Description of the Related Art

Methods and techniques based on combinatorial screening using robotic platforms have been developed for enzyme optimization, pathway optimization, investigation of cell metabolism, and drug screening. However, the number of conditions that these methods and techniques can screen and track may be limited. Thus, there is a need for methods and systems capable of screening large combinatorial spaces of conditions (e.g., reaction conditions in solutions) and tracking liquid solutions with these conditions.

SUMMARY

Disclosed herein are methods for tracking liquid solutions using mass spectroscopy. In some embodiments, the method comprises: contacting a first lanthanide-chelator complex to a first solution to generate a first barcoded solution, wherein the first lanthanide-chelator complex comprises a first lanthanide chelated by a first chelator; contacting a second lanthanide-chelator complex to a second solution to generate a second barcoded solution, wherein the second lanthanide-chelator complex comprises a second lanthanide chelated by a second chelator; mixing the first barcoded solution and the second barcoded solution to form one or more mixtures; generating a mass spectrum of each of the one or more mixtures; and identifying the first lanthanide ions in the mass spectrum and the second lanthanide ions in the mass spectrum to track the condition of each of the one or more mixtures.

In some embodiments, the first lanthanide-chelator complex or the second lanthanide-chelator complex comprises Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, Ytterbium 176, or any combination thereof. The first lanthanide and the second lanthanide can be different. At least two of the one or more mixtures can comprise different ratios of the first solution and the second solution.

The chelators of different lanthanide-chelator complexes can vary. In some embodiments, the chelator can be 2,2', 2"-(10-(2-((5-aminopentyl)amino)-2-oxoethyl)-1,4,7,10-tetraazacyclododecane-1,4,7-triyl)triacetic acid, abbreviated as DOTA-NH, or a derivative thereof. In some embodiments, the chelator can be ethylenediaminetetraacetic acid, 1,4,7,10-tetraazacyclododecane-1,4,7,10-tetraacetic acid, diethylenetriaminepentaacetic acid, or any derivative thereof. In some embodiments, identifying the first lanthanide ions in the mass spectrum and the second lanthanide ions in the mass spectrum comprises determining the ratio of the first lanthanide ions to the second lanthanide ions in the mass spectrum. The first chelator and the second chelator can be the same. Different lanthanide-chelator complexes can include different chelators. In some embodiments, one lanthanide-chelator complex can be DOTA-NH, and another lanthanide-chelator complex can be a DOTA-NH derivative.

In some embodiments, the first barcoded solution comprises a first enzyme. The second barcoded solution can comprise a first substrate. The first enzyme can be incubated with the first substrate in the one or more mixtures. The condition of each of the one or more mixtures can comprise the reaction condition of the mixture of the one or more mixtures.

In some embodiments, the method further comprises: contacting a third lanthanide-chelator complex to a third solution to generate a third barcoded solution, wherein the third lanthanide-chelator complex comprises a third lanthanide chelated by a third chelator, wherein mixing the first barcoded solution and the second barcoded solution to form the one or more mixtures comprises mixing the first barcoded solution, the second barcoded solution, and the third barcoded solution to from the one or more mixtures; and identifying the third lanthanide ions in the mass spectrum to track the condition of the each of the one or more mixtures.

In some embodiments, first barcoded solution comprises a first enzyme. The second barcoded solution can comprise a first substrate. The first enzyme can be incubated with the first substrate in the one or more mixtures. In some embodiments, the third solution comprises a second enzyme. The second enzyme can be incubated with the first substrate in the one or more mixtures. In some embodiments, the third solution comprises a second substrate. The first enzyme can be incubated with the second substrate in the one or more mixtures.

In some embodiments, identifying the first lanthanide ions, the second lanthanide ions, and the third lanthanide in the mass spectrum comprises determining the ratio of the first lanthanide ions to the second lanthanide ions and the ratio of the third lanthanide to the second lanthanide.

In some embodiments, the one or more mixtures comprise at least 10, 100, or 1000 mixtures. The volume of at least one of the one or more mixtures can be about 1 microliter, about 1 nanoliter, or about 1 picoliter. The mass spectrum can be generated using soft ionization mass spectrometry (MS), such as matrix associated laser desorption ionization (MALDI-MS). The mass spectrum can be generated using electrospray ionization MS (ESI-MS), liquid chromatography ESI-MS, nanostructure-initiator MS, fast atom bombardment MS, chemical ionization MS, atmospheric-pressure chemical ionization MS, matrix-assisted laser desorption/ionization MS, or any combination thereof.

Disclosed herein are methods for tracking liquid solutions (e.g., reaction conditions in solutions). In some embodiments, the method comprises: contacting a first lanthanide-chelator complex to a first solution to generate a first barcoded solution, wherein the first barcoded solution comprises a first enzyme and wherein the first lanthanide-chelator complex comprises a first lanthanide chelated by a first chelator; contacting a second lanthanide-chelator complex to a second solution to generate a second barcoded solution, wherein the second barcoded solution comprises a first substrate and wherein the second lanthanide-chelator complex comprises a second lanthanide chelated by a second chelator; mixing the first barcoded solution and the second barcoded solution to form one or more mixtures, wherein the first enzyme is incubated with the first substrate in the one or more mixtures; generating a mass spectrum of each of the one or more mixtures; and identifying the first lanthanide ions in the mass spectrum and the second lanthanide ions in the mass spectrum to track the condition (e.g., reaction conditions) of each of the one or more mixtures. The method can screen a large combinatorial space of conditions. At least two of the one or more mixtures can comprise different ratios of the first solution and the second solution In some embodiments, the first lanthanide-chelator complex or the second lanthanide-chelator complex comprises: Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, Ytterbium 176, or any combination thereof.

The chelators of different lanthanide-chelator complexes can vary. In some embodiments, the chelator can be 2,2',2"-(10-(2-((5-aminopentyl)amino)-2-oxoethyl)-1,4,7,10-tetraazacyclododecane-1,4,7-triyl)triacetic acid, abbreviated as DOTA-NH, or a derivative thereof. In some embodiments, the chelator can be ethylenediaminetetraacetic acid, 1,4,7,10-tetraazacyclododecane-1,4,7,10-tetraacetic acid, diethylenetriaminepentaacetic acid, or any derivative thereof. In some embodiments, identifying the first lanthanide ions in the mass spectrum and the second lanthanide ions in the mass spectrum comprises determining the ratio of the first lanthanide ions to the second lanthanide ions in the mass spectrum. Different lanthanide-chelator complexes can include different chelators. In some embodiments, one lanthanide-chelator complex can be DOTA-NH, and another lanthanide-chelator complex can be a DOTA-NH derivative.

In some embodiments, the method comprises: contacting a third lanthanide-chelator complex to a third solution to generate a third barcoded solution, wherein the third solution comprises a second enzyme and wherein the third lanthanide-chelator complex comprises a third lanthanide chelated by a third chelator, wherein mixing the first barcoded solution and the second barcoded solution to form one or more mixtures comprises mixing the first barcoded solution, the second barcoded solution, and the third barcoded solution to from the one or more mixtures and wherein the second enzyme is incubated with the first substrate in the one or more mixtures; and identifying the third lanthanide ions in the mass spectrum to track the condition of each of the one or more mixtures.

In some embodiments, the method comprises: contacting a third lanthanide-chelator complex to a third solution to generate a third barcoded solution, wherein the third solution comprises a second substrate and wherein the third lanthanide-chelator complex comprises a third lanthanide chelated by a third chelator, wherein mixing the first barcoded solution and the second barcoded solution to form one or more mixtures comprises mixing the first barcoded solution, the second barcoded solution, and the third barcoded solution to from the one or more mixtures and wherein the first enzyme is incubated with the second substrate in the mixtures; and identifying the third lanthanide in the mass spectrum to track the condition of each of the one or more mixtures.

In some embodiments, identifying the first lanthanide ions, the second lanthanide ions, and the third lanthanide in the mass spectrum comprises determining the ratio of the first lanthanide ions to the second lanthanide ions and the ratio of the third lanthanide to the second lanthanide.

In some embodiments, the one or more mixtures comprise at least 10, 100, or 1000 mixtures. The volume of at least one of the one or more mixtures can be about 1 microliter, about 1 nanoliter, or about 1 picoliter. The mass spectrum can be generated using soft ionization mass spectrometry (MS), such as matrix associated laser desorption ionization (MALDI-MS). The mass spectrum can be generated using electrospray ionization MS (ESI-MS), liquid chromatography ESI-MS, nanostructure-initiator MS, fast atom bombardment MS, chemical ionization MS, atmospheric-pressure chemical ionization MS, matrix-assisted laser desorption/ionization MS, or any combination thereof.

Disclosed herein are kits for tracking liquid solutions (e.g., reaction conditions in solutions). In some embodiments, the kit can comprise: a first lanthanide-chelator complex comprising a first lanthanide chelated by a first chelator; and a second lanthanide-chelator complex comprising a second lanthanide chelated by a second chelator.

In some embodiments, the first lanthanide-chelator complex or the second lanthanide-chelator complex comprises: Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, Ytterbium 176, or any combination thereof.

In some embodiments, the first chelator or the second chelator can be one of 2,2',2"-(10-(2-((5-aminopentyl)amino)-2-oxoethyl)-1,4,7,10-tetraazacyclododecane-1,4,7-triyl)triacetic acid or its derivatives. The first lanthanide and the second lanthanide can be different, and the first chelator and the second chelator can be the same.

In some embodiments, the first lanthanide-chelator complex can be comprised in a first solution, and wherein the second lanthanide chelator can be comprised in a second solution. The second solution can comprise a first substrate. In some embodiments, the kit comprises a third lanthanide-chelator complex, wherein the third lanthanide-chelator complex comprises a third lanthanide chelated by a third chelator. The kit can comprise a buffer.

Disclosed herein are lanthanide-chelator libraries of internal standards with comparable ionization properties. In some embodiment, the lanthanide-chelator library is prepared by a process comprising the steps of: contacting a first lanthanide-chelator complex to a first solution to generate a first barcoded solution, wherein the first lanthanide-chelator complex comprises a first lanthanide chelated by a first chelator; contacting a second lanthanide-chelator complex to a second solution to generate a second barcoded solution, wherein the second lanthanide-chelator complex comprises a second lanthanide chelated by a second chelator; and mixing the first barcoded solution and the second barcoded solution to form one or more mixtures.

In some embodiments, the first lanthanide-chelator complex or the second lanthanide-chelator complex comprises: Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, Ytterbium 176, or any combination thereof.

In some embodiments, the first chelator or the second chelator is one of 2,2',2''-(10-(2-((5-aminopentyl)amino)-2-oxoethyl)-1,4,7,10-tetraazacyclododecane-1,4,7-triyl)triacetic acid or a derivative thereof.

BRIEF DESCRIPTION OF THE DRAWINGS

FIGS. 2A-B are non-limiting exemplary mass spectra of lanthanide-chelator complexes.

FIGS. 3A-C are non-limiting exemplary figures showing similar relative mass spectrometry intensities of lanthanide-chelator complexes at different concentrations.

DETAILED DESCRIPTION

Figure 1:
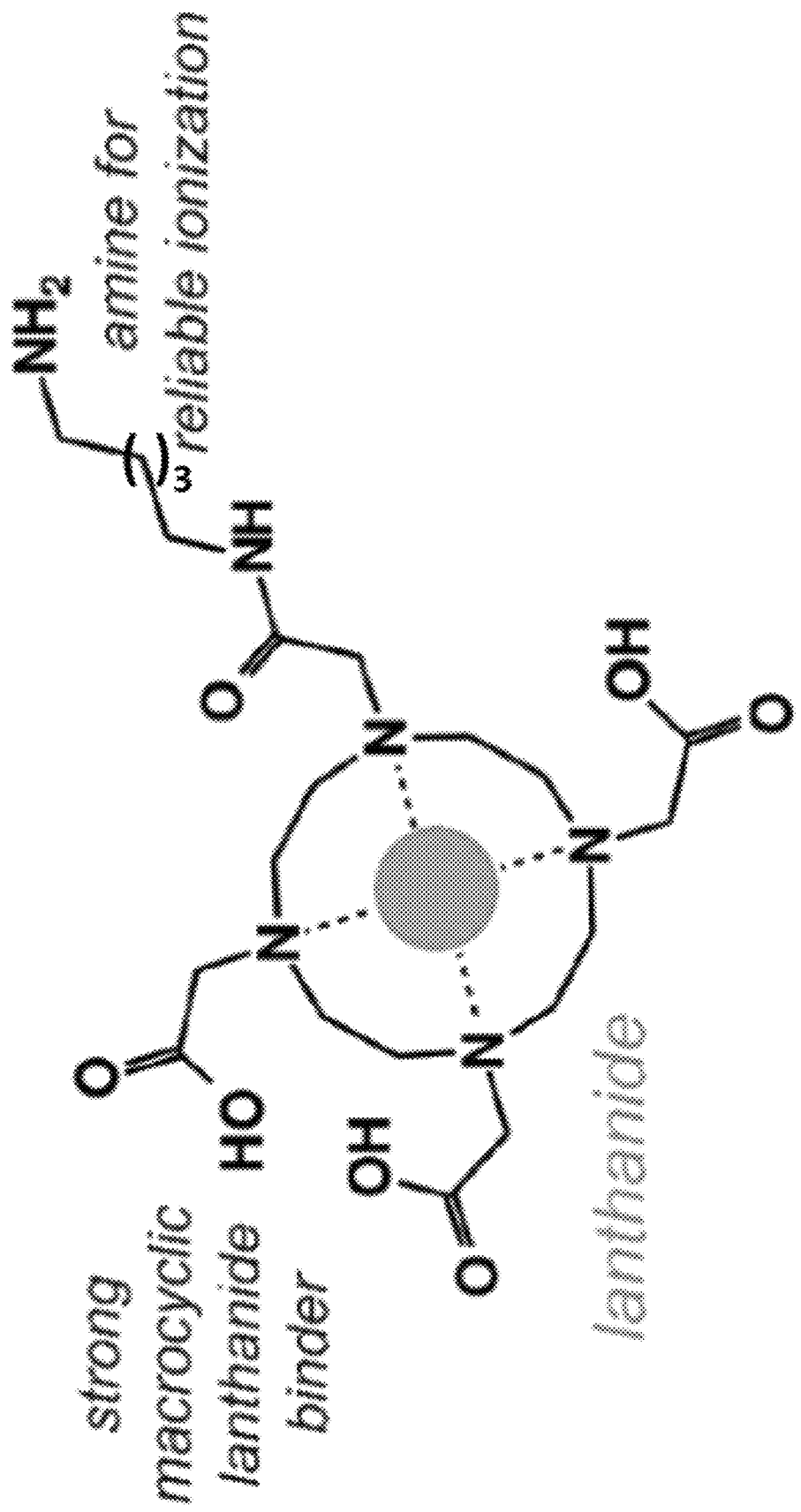
FIG. 1 shows a non-limiting exemplary lanthanide-chelator complex.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

A lanthanide barcode, a combination of one or more lanthanide-chelator complexes, can be used to track the combinatorial input conditions. The one or more lanthanide-chelator complexes can be detectable in soft ionization mass spectrometry (MS) in parallel with metabolites or substrates of interest. The chelator can have a high lanthanide affinity, for example the chelator can be, or can include, 2,2',2''-(10-(2-((5-aminopentyl)amino)-2-oxoethyl)-1,4,7,10-tetraazacyclododecane-triyl)triacetic acid, abbreviated as DOTA-NH. The conjugated lanthanide-chelator complexes can advantageously maintain robust or strong lanthanide binding and single-charge ionization. The m/z of the lanthanide-chelator complexes (which can have single-charge ionization) can be adjusted by selecting a lanthanide isotope (e.g., between atomic masses of 140 and 180). Thus, mass spectrometry can readily detect lanthanide-chelator complexes.

Unique lanthanide barcodes can track each reaction components, such as enzymes, substrates and cofactors, in the generation of combinatorial conditions to determine their relative abundances in the final combined reaction. Thus, the relative abundances of reaction components and changes in reaction components such as the catalysis of substrates into reaction products can be determined in one mass spectrum.

Furthermore, combinatorial conditions can be generated faster, for example, by stochastically merging droplets containing different conditions. Accordingly, the methods, systems, and compositions disclosed herein can advantageously enable faster testing of more diverse conditions and/or combinations.

Combinatorial screening can be a powerful approach to test a high diversity of conditions. A critical bottleneck in combinatorial screens may be the time required to produce combinations under investigation. For example, using microarray printing, most screens may be limited to ~$10^3$ conditions—far less than would be required to investigate a complex parameter space, e.g. $10^6$ conditions (10 variables over 6 concentrations). A combinatorial barcode with one or more lanthanide-chelator complexes for assay inputs that can be readout with biomolecular outputs as disclosed herein can offer new opportunities in generating combinatorial conditions. The methods, systems, and compositions disclosed herein can have one or more of the following properties or advantages: non-disruption of biological activity, capable of quantifiable tracking of reaction components, a relative unbiased readout from barcode to barcode. In some embodiments, lanthanide-chelator complexes can have a linear (or close to linear) dose-response (e.g., relative to a lanthanide-chelator complex used as an internal standard) over a few orders of magnitude (e.g., two, three, four, five, ten, or more) in concentration, thus advantageously simplifying quantification.

The chelators, for example DOTA-NH, can have one or more of the following properties or advantages: a strong macrocyclic lanthanide binder which makes the bound lanthanide non-bioreactive, strong ionization via the amine group. The ionization group, for example the amine group a chelator such as DOTA-NH, can be modified to change the ionization property of a lanthanide-chelator complex. The chelator can be modified to change the molecular weight of a lanthanide-chelator complex.

The lanthanide barcode can have one or more of the following properties: comparable ionization barcode to barcode, concentrated over small m/z window, no bio-reactivity, stable, or lanthanide-chelator complexes having identical ionization properties.

The methods, systems, and compositions disclosed herein can have broad applicability across the pharmaceutical, biomanufacturing, and diagnostics industries. For example, the combinatorial screening disclosed herein can be used for applications including, but are not limited to, drug discovery and optimization, biomanufacturing, and diagnostics. For example, combinatorial screening can be of interest for drug activity and toxicity, pathway optimization or biological parts characterization. The readouts can be performed using mass spectrometry. As another example, independent variables that can be screened include enzymes and substrates, relative composition and concentration, metals, solvent and pH, or reaction volume. As yet another example, the methods, systems, and compositions disclosed herein can be used for enzyme optimization (e.g. non-specific activity), pathway optimization, cell metabolism, drug screening (e.g. activity, toxicity, dissociation constant), sample tracking of large parameter spaces of liquid solutions (e.g., reaction conditions in solutions), phenotypic tracking, quantifying reactants such as enzymes and substrates, or medical imaging.

The methods and systems disclosed herein can comprise generating an internal standard library using a lanthanide-chelator complex. The peak intensity of lanthanide-chelator complexes relative to one another can be used for combinatorial screening applications where maintaining comparable ionization between standards over a large range of conditions (e.g. changing pH, salt content, solvent, etc.) may be desirable.

Definitions

Unless defined otherwise, technical and scientific terms used herein have the same meaning as commonly understood by one of ordinary skill in the art to which the present disclosure belongs. See, e.g. Singleton et al., Dictionary of Microbiology and Molecular Biology 2nd ed., J. Wiley & Sons (New York, N.Y. 1994); Sambrook et al., Molecular Cloning, A Laboratory Manual, Cold Springs Harbor Press (Cold Springs Harbor, N.Y. 1989).

Disclosed herein are methods for tracking liquid solutions (e.g., reaction conditions in solutions). In some embodiments, the method comprises: contacting a first lanthanide-chelator complex to a first solution to generate a first barcoded solution, wherein the first lanthanide-chelator complex comprises a first lanthanide chelated by a first chelator; contacting a second lanthanide-chelator complex to a second solution to generate a second barcoded solution, wherein the second lanthanide-chelator complex comprises a second lanthanide chelated by a second chelator; mixing the first barcoded solution and the second barcoded solution to form one or more mixtures; generating a mass spectrum of each of the one or more mixtures; and identifying the first lanthanide ions in the mass spectrum and the second lanthanide ions in the mass spectrum to track the condition of each of the one or more mixtures.

In some embodiments, the method comprises: contacting a first lanthanide-chelator complex to a first solution to generate a first barcoded solution, wherein the first barcoded solution comprises a first enzyme and wherein the first lanthanide-chelator complex comprises a first lanthanide chelated by a first chelator; contacting a second lanthanide-chelator complex to a second solution to generate a second barcoded solution, wherein the second barcoded solution comprises a first substrate and wherein the second lanthanide-chelator complex comprises a second lanthanide chelated by a second chelator. The first lanthanide and the second lanthanide can be the same or different. The first chelator and the second chelator can be the same or different. In some embodiments, the method comprises: mixing the first barcoded solution and the second barcoded solution to form one or more mixtures, wherein the first enzyme is incubated with the first substrate in the one or more mixtures; generating a mass spectrum of each of the one or more mixtures; and identifying the first lanthanide ions in the mass spectrum and the second lanthanide ions in the mass spectrum to track the condition of each of the one or more mixtures. The method can be used to screen a large combinatorial space of conditions (e.g., reaction conditions). The method can track liquid solutions comprising a large combinatorial space of conditions. At least two of the one or more mixtures can comprise different ratios of the first solution and the second solution.

Disclosed herein are kits for tracking liquid solutions (e.g., reaction conditions in solutions). In some embodiments, the kit can comprise: a first lanthanide-chelator complex comprising a first lanthanide chelated by a first chelator; and a second lanthanide-chelator complex comprising a second lanthanide chelated by a second chelator.

Lanthanide Barcoding

Disclosed herein are methods for tracking liquid solutions using mass spectroscopy. In some embodiments, the method comprises: contacting a first lanthanide-chelator complex to a first solution to generate a first barcoded solution, wherein the first lanthanide-chelator complex comprises a first lanthanide chelated by a first chelator; contacting a second lanthanide-chelator complex to a second solution to generate a second barcoded solution, wherein the second lanthanide-chelator complex comprises a second lanthanide chelated by a second chelator; mixing the first barcoded solution and the second barcoded solution to form one or more mixtures; generating a mass spectrum of each of the one or more mixtures; and identifying the first lanthanide ions in the mass spectrum and the second lanthanide ions in the mass spectrum to track the condition of each of the one or more mixtures.

Disclosed herein are methods for tracking liquid solutions (e.g., reaction conditions in liquid solutions). In some embodiments, the method comprises: contacting a first lanthanide-chelator complex to a first solution to generate a first barcoded solution, wherein the first barcoded solution comprises a first enzyme and wherein the first lanthanide-chelator complex comprises a first lanthanide chelated by a first chelator; contacting a second lanthanide-chelator complex to a second solution to generate a second barcoded solution, wherein the second barcoded solution comprises a first substrate and wherein the second lanthanide-chelator complex comprises a second lanthanide chelated by a second chelator; mixing the first barcoded solution and the second barcoded solution to form one or more mixtures, wherein the first enzyme is incubated with the first substrate in the one or more mixtures; generating a mass spectrum of each of the one or more mixtures; and identifying the first lanthanide ions in the mass spectrum and the second lanthanide ions in the mass spectrum to track the condition of each of the one or more mixtures. At least two of the one or more mixtures can comprise different ratios of the first solution and the second solution.

In some embodiments, identifying the first lanthanide ions in the mass spectrum and the second lanthanide ions in the mass spectrum comprises determining the ratio of the first lanthanide ions to the second lanthanide ions in the mass spectrum.

In some embodiments, the method comprises: contacting a third lanthanide-chelator complex to a third solution to generate a third barcoded solution, wherein the third solution comprises a second enzyme and wherein the third lanthanide-chelator complex comprises a third lanthanide chelated by a third chelator, wherein mixing the first barcoded solution and the second barcoded solution to form one or more mixtures comprises mixing the first barcoded solution, the second barcoded solution, and the third barcoded solution to from the one or more mixtures and wherein the second enzyme is incubated with the first substrate in the one or more mixtures; and identifying the third lanthanide ions in the mass spectrum to track the condition (e.g., reaction condition) of each of the one or more mixtures.

In some embodiments, the method comprises: contacting a third lanthanide-chelator complex to a third solution to generate a third barcoded solution, wherein the third solution comprises a second substrate and wherein the third lanthanide-chelator complex comprises a third lanthanide chelated by a third chelator, wherein mixing the first barcoded solution and the second barcoded solution to form one or more mixtures comprises mixing the first barcoded solution, the second barcoded solution, and the third barcoded solution to from the one or more mixtures and wherein the first enzyme is incubated with the second substrate in the mixtures; and identifying the third lanthanide in the mass spectrum to track the condition (e.g., reaction condition) of each of the one or more mixtures.

In some embodiments, identifying the first lanthanide ions, the second lanthanide ions, and the third lanthanide in the mass spectrum comprises determining the ratio of the first lanthanide ions to the second lanthanide ions and the ratio of the third lanthanide to the second lanthanide.

The m/z of the lanthanide-chelator complexes (which can advantageously have single-charge ionization) can be adjusted by selecting a lanthanide isotope (e.g., between atomic masses of 140 and 180). Thus, mass spectrometry can readily detect lanthanide-chelator complexes. Table 1 shows exemplary lanthanide isotopes that can be used in the methods, composition, and systems disclosed herein. In some embodiments, the lanthanide of a lanthanide-chelator can be one of: Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, or Ytterbium 176.

TABLE 1

Lanthanide isotopes and lanthanide-chelator complexes

| Lanthanide | Isotope | Lanthanide Mass | Lanthanide-DOTA-NH Mass |
|---|---|---|---|
| Cerium | 136 | 135.90714 | 622.30 |
| Cerium | 138 | 137.905996 | 624.30 |
| Cerium | 140 | 139.905442 | 626.30 |
| Praseodymium | 141 | 140.907657 | 627.31 |
| Cerium | 142 | 141.909249 | 628.31 |
| Neodymium | 142 | 141.907731 | 628.31 |
| Neodymium | 143 | 142.909823 | 629.31 |
| Neodymium | 144 | 143.910096 | 630.31 |
| Samarium | 144 | 143.912009 | 630.31 |
| Neodymium | 145 | 144.912582 | 631.31 |
| Neodymium | 146 | 145.913126 | 632.31 |
| Samarium | 147 | 146.914907 | 633.31 |
| Neodymium | 148 | 147.916901 | 634.31 |
| Samarium | 149 | 148.917193 | 635.31 |
| Samarium | 150 | 149.917285 | 636.31 |
| Europium | 151 | 150.91986 | 637.32 |
| Samarium | 152 | 151.919741 | 638.32 |
| Europium | 153 | 152.921243 | 639.32 |
| Gadolinium | 154 | 153.920876 | 640.32 |
| Samarium | 154 | 153.922218 | 640.32 |
| Gadolinium | 155 | 154.822629 | 641.22 |
| Dysposium | 156 | 155.924287 | 642.32 |
| Gadolinium | 156 | 155.92213 | 642.32 |
| Gadolinium | 157 | 156.923967 | 643.32 |
| Dysposium | 158 | 157.924412 | 644.32 |
| Gadolinium | 158 | 157.924111 | 644.32 |
| Terbium | 159 | 158.92535 | 645.32 |
| Dysposium | 160 | 159.925203 | 646.32 |
| Gadolinium | 160 | 159.927061 | 646.32 |
| Dysposium | 161 | 160.926939 | 647.32 |
| Dysposium | 162 | 161.926805 | 648.32 |
| Erbium | 162 | 161.928787 | 648.33 |
| Dysposium | 163 | 162.928737 | 649.33 |
| Dysposium | 164 | 163.929183 | 650.33 |
| Erbium | 164 | 163.929211 | 650.33 |
| Holmium | 165 | 164.930332 | 651.33 |
| Erbium | 166 | 165.930305 | 652.33 |
| Erbium | 167 | 166.932061 | 653.33 |
| Erbium | 168 | 167.932383 | 654.33 |
| Ytterbium | 168 | 167.933908 | 654.33 |
| Thulium | 169 | 168.934225 | 655.33 |
| Erbium | 170 | 169.935476 | 656.33 |
| Ytterbium | 170 | 169.934774 | 656.33 |
| Ytterbium | 171 | 170.936338 | 657.33 |
| Ytterbium | 172 | 171.936393 | 658.33 |
| Ytterbium | 173 | 172.938222 | 659.34 |
| Ytterbium | 174 | 173.938873 | 660.34 |
| Lutetium | 175 | 174.940785 | 661.34 |
| Ytterbium | 176 | 175.942576 | 662.34 |

In some embodiments, lanthanide-chelator complexes can have a linear (or close to linear) dose-response (e.g., relative to a lanthanide-chelator complex used as an internal standard) over a few orders of magnitude in concentration, thus advantageously simplifying quantification. The order of magnitude in concentration over which lanthanide-chelator complexes can have a linear (or close to linear) dose-response can be, or be around, 1, 2, 3, 4, 5, 6, 7, 8, 9, 10, 20, 30, 40, 50, 60, 70, 80, 90, 100, or a number or a range between any two of these values. The order of magnitude in concentration over which lanthanide-chelator complexes can have a linear (or close to linear) dose-response can be at least, or at most, 1, 2, 3, 4, 5, 6, 7, 8, 9, 10, 20, 30, 40, 50, 60, 70, 80, 90, or 100. In some embodiments, being close to a linear dose-response means a deviation from linear dose-response by at most 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, or 25%. In some embodiments, being close to a linear dose-response means a deviation from a linear dose-response by, or by about, t 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, or a number of a range between any two of these values.

Combinatorial Screening Space

The methods, compositions, and systems disclosed herein can be used to screen a large combinatorial space of conditions (e.g., reaction conditions) or track liquid solutions with these conditions for enzyme optimization, pathway optimization, investigation of cell metabolism, and drug screening. A critical bottleneck in combinatorial screens may be the time required to produce combinations under investigation. For example, using microarray printing, most screens may be limited to ~$10^3$ conditions—far less than would be required to investigate a complex parameter space, e.g. $10^6$ conditions (10 variables over 6 concentrations).

The number of parameters screened can vary. For example, the number of parameters screened can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values. As another example, the number of parameters screened can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, or 1000.

The number of variations (such as concentrations) of each parameter screened can vary. For example, the number of variations for each parameter screened can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values. As another example, the number of parameters screened can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, or 1000.

The number of reaction conditions screened or liquid solutions tracked can vary. For example, the number of reaction conditions screened or liquid solutions tracked can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, $10^4$, $10^5$, $10^6$, $10^7$, $10^8$, $10^9$, or a number or a range between any two of these values. For example, the number of reaction conditions screened or liquid solutions tracked can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, 1000, $10^4$, $10^5$, $10^6$, $10^7$, $10^8$, or $10^9$. Accordingly, the methods, systems, and compositions disclosed herein can advantageously enable faster generation and/or testing of more diverse conditions and/or combinations, eliminating a critical bottleneck in combinatorial screening.

Lanthanide—Chelator Barcodes

The chelators used in the methods, compositions, and systems disclosed herein can vary. A chelator molecule can have a strong macrocyclic lanthanide binding domain and an amine group for facile ionization for mass spectrometry detection. Thus, the conjugated lanthanide-chelator complexes can advantageously maintain robust or strong lanthanide binding. In some embodiments, properties or advantages of lanthanide-chelator complexes include non-disruption of biological activity, quantifiable tracking of precursor components, or an unbiased readout from barcode to barcode, making it ideal for testing a high diversity of conditions.

FIG. 1 shows a non-limiting exemplary lanthanide-chelator complex, 2,2',2"-(10-(2-((5-aminopentyl)amino)-2-oxoethyl)-1,4,7,10-tetraazacyclododecane-1,4,7-triyl)triacetic acid, abbreviated as DOTA-NH. Other chelator molecules can have a similar lanthanide binding regions but alternative tails can be synthesized for a wide range of applications.

DOTA-NH and other chelator molecules, when conjugated to a lanthanide isotope, can have comparable ionization properties under similar mass spectrometry conditions. For example, DOTA-NH and other chelator molecules may be affected by mass spectrometry conditions to similar extents. As another example, the conjugates of a lanthanide with DOTA-NH or another chelator molecule can have similar mass spectrometry intensity relative to a lanthanide-chelator molecular, for example Yb176-DOTA-NH. In some embodiments, the similar relative intensity can be within, or within about, 1%, 2%, 3%, 4%, 5%, 6%, 7%, 8%, 9%, 10%, 20%, or a number or a range between any two of these values, of one another. In some embodiments, the similar relative intensity can be within at most 1%, 2%, 3%, 4%, 5%, 6%, 7%, 8%, 9%, 10%, or 20%.

Chelators such as DOTA-NH can have a high lanthanide affinity, resulting in effective lanthanide binding. The chelators can have single-charge ionization (or any other predetermined number of charge ionization). Lanthanide barcodes can be used to monitor each precursor component in the generation of combinatorial conditions to determine its relative abundance in the final combined mixture. The lanthanide/chelator complexes are detected in positive mode matrix assisted laser desorption ionization (MALDI) MS for every lanthanide species assessed.

Possible modifications can include the following. In some embodiments, the mass of a chelator and the m/z of a lanthanide-chelator complex comprising the chelator can be shifted by adding carbons to the tail length of the amine group of DOTA-NH. For example, adding a C3H6 to the tail can result in a 42 mass unit shift. The shift can be performed for a variety of purposes. In some embodiments, this shift can be performed to create additional lanthanide-chelator complexes, for example, in addition to the 39 non-redundant lanthanide isotopes. In some embodiments, this shift can be performed to move the barcode away from non-barcode ions which could contaminate the readout.

In some embodiments, chelators can be modified by, for example having elements C13, N16, O17 or H2 in the chelators. In some embodiments, a perfluorinated carbon chain can be added to a chelator such as DOTA-NH. For example, the —$(CH_2)_3NH_2$ chain of a chelator can be replaced with a —$(CF_2)_7CF_3$ chain. This modified can increase adsorption to fluorinated surfaces and increase compatibility with such as nanostructure initiated mass spectrometry (NIMS).

In some embodiments, an affinity group can be added to a chelator to immobilize a lanthanide-chelator molecule including the chelator onto a surface or attach it to another molecule. Examples include a thiol group, polyhistidine-tag, streptavidin/biotin, carboxyl group, amine, amide, alkene, alcohol, DNA, and RNA. In some embodiments, a chelator can be attached to biomolecules such as DNA, RNA, peptides, lipids, metabolites, and antibodies. In some embodiments, a chelator can be modified by click chemistry.

Mixture Volume

The methods, compositions, and systems disclosed herein can be used to incubate an enzyme in one or more mixtures. Mixture volumes can vary. In some embodiments, the volume of one mixture or the volume of at least one mixture can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, picoliters. In some embodiments, the volume of one mixture or the volume of at least one mixture can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, or 1000, picoliters. In some embodiments, the volume of a mixture or the volume of at least one mixture can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, nanoliters. In some embodiments, the volume of a mixture or the volume of at least one mixture can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, or 1000, nanoliters. In some embodiments, the volume of a mixture or the volume of at least one mixture can be, or be about, 1, 2, 3, 4, 5, 6, 7, 8, 9, 10, or a number or a range between any two of these values, microliters. In some embodiments, the volume of a mixture can be at least, or at most, 1, 2, 3, 4, 5, 6, 7, 8, 9, or 10, microliters.

Mixtures and Microwell Array

The methods, compositions, and systems disclosed herein can be used to incubate an enzyme in one or more mixtures, for example droplets. In some embodiments, mixtures can be deposited onto wells of a microwell array, for example a microtiter plate. A microwell array can comprise microwells of varying densities, for example ranging from 100 microwells per inch$^2$ to 10000 microwells per inch$^2$. In some embodiments, the number of microwells in a microwell array can be or can be about 100, 200, 300, 400, 500, 600, 700, 800, 900, 1000, 2000, 3000, 4000, 5000, 6000, 7000, 8000, 9000, 10000, 20000, 30000, 40000, 50000, or a number or a range between any two of these values, microwells per inch$^2$. In some embodiments, the number of microwells in a microwell array can be at least or can be at most 100, 200, 300, 400, 500, 600, 700, 800, 900, 1000, 2000, 3000, 4000, 5000, 6000, 7000, 8000, 9000, 10000, 20000, 30000, 40000, or 50000, microwells per inch$^2$. In some embodiments, the number of microwells in a microwell array can be or can be about 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, 10000, or a number or a range between any two of these values, microwells per cm$^2$. In some embodiments, the number of microwells in a microwell array can be at least or can be at most 10, 20, 30, 40, 50, 60, 70, 80, 90, 100, 200, 300, 400, 500, 600, 700, 800, 900, 1000, 2000, 3000, 4000, 5000, 6000, 7000, 8000, 9000, or 10000 microwells per cm$^2$.

The total number of wells in a microwell array can vary based on the pattern and the spacing of the wells and the overall dimensions of the array. The number of microwells in the array can vary, for example, ranging from about 96 to about 1000000. In some embodiments, the number of microwells in the microarray can be or can be about 96, 384, 1536, 2000, 3000, 4000, 5000, 6000, 7000, 8000, 9000, 10000, 20000, 30000, 40000, 50000, 60000, 70000, 80000, 90000, 100000, or a number or a range between any two of these values. In some embodiments, the number of microwells in the microarray can be at least or can be at most 96, 384, 1536, 2000, 3000, 4000, 5000, 6000, 7000, 8000, 9000, 10000, 20000, 30000, 40000, 50000, 60000, 70000, 80000, 90000, or 100000. In some embodiments, the number of microwells in the microwell array can be about 96. In some embodiments, the number of microwells can be about 150000.

Mass Spectrometry

The methods, compositions, and systems disclosed herein can utilize mass spectrometry to generate a mass spectrum for each mixture after incubating an enzyme with a substrate. Readouts of lanthanide-chelator combinatorial screening, describing combinatorial input conditions, can be detected using a number of mass spectrometry (MS) methods (e.g., soft ionization mass spectrometry) in parallel with metabolites of interest. In some embodiments, the mass spectrum can be generated using soft ionization mass spectrometry (MS), such as matrix associated laser desorption ionization (MALDI-MS). In some embodiments, the mass spectrum can be generated using electrospray ionization MS (ESI-MS), liquid chromatography ESI-MS, nanostructure-initiator MS, fast atom bombardment MS, chemical ionization MS, atmospheric-pressure chemical ionization MS, matrix-assisted laser desorption/ionization MS, or any combination thereof. In some embodiments, every lanthanide-chelator complexes used to track liquid solutions (e.g., reaction conditions in solutions) can be detected in positive mode matrix assisted laser desorption ionization (MALDI) MS on a AB Sciex 4800 (AB Sciex (Framingham, Mass.)).

Substrates

The methods, compositions, and systems disclosed herein can utilize different substrates to produce varying reaction products. In some embodiments, a substrate can be 6-mercaptopurine, cellobiose, cellotetraose, xylotetraose, isoprimeverose, β-D-gentiobiose, xyloglucan and mannotriose, or any combination thereof. In some embodiments, the one or more substrate can be agarose, aminic acid, starch, oligosaccharide, polysaccharide, cellulose, ceramide, chitine, chitosan, dextrose, dextrins, fructose, fucoidan, fucose, furanoside, galactoside, glucan, glucopyranoside, glucoside, glucuronic acid, glucuronoside, glycose, glycoside, glycosaminoglycan, hexaoside, inulin, lactose, levanose, lipopolysaccharide, mannose, maltoside, maltotrioside, mannose, octulosonate, oligosaccharide, pectate, pectin, peptide, polygalacturonide, polynucleotides, pullulan, rhamnoside, xylan, or any combination thereof.

Substrates can differ from one another. In some embodiments, substrates can differ from one another by at least one functional group. The at least one functional group can be alkyl, alkenyl, alkynyl, phenyl, benzyl, halo, fluoro, chloro, bromo, iodo, hydroxyl, carbonyl, aldehyde, haloformyl, carbonate ester, carboxylate, carboxyl, ester, methoxy, hydroperoxy, peroxy, ether, hemiacetal, hemiketal, acetal, ketal, acetal, orthoester, methylenedioxy, orthocarbonate ester, carboxamide, primary amine, secondary amine, tertiary amine, 4° ammonium, primary ketamine, secondary ketamine, primary aldimine, secondary aldimine, imide, azide, azo, diimide, cyanate, isocyanate, nitrate, nitrile, isonitrile, nitrosooxy, nitro, nitroso, pyridyl, sulfhydryl, sulfide, disulfide, sulfinyl, sulfonyl, sulfino, sulfo, thiocyanate, isothiocyanate, carbonothione, carbonothial, phosphino, phosphono, phosphate, phosphodiester, borono, boronate, borino, or borinate. In some embodiments, substrates can be lignin, cellulose, glucose, sugar, excrement, environmental contaminants such as common environmental contaminants, switchgrass, or any combination thereof. In some embodiments, substrates can be any chemical compounds suitable for in vitro or in vivo transformation by enzymes, cells, or tissues. In some embodiments, substrates can be any chemical compounds that can by catalyzed by any catalysts, for example chemical catalysts or biological catalysts such as enzymes.

In some embodiments, substrates can differ from one another by or by about 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, Daltons. In some embodiments, substrates can differ from one another by at least or by at most 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, Daltons.

Substrates and reaction products can have different structures and molecular weights. A substrate and a reaction product can have different structures and molecular weights. In some embodiments, a substrate can differ from its corresponding reaction product by at least one functional group. In some embodiments, a substrate can differ from its corresponding reaction product by, or by about, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, Daltons. In some embodiments, a substrate can differ from its corresponding reaction product by at least, or at most, 1, 2, 3, 4, 5, 6, 7, 8, 9, 10, 20, 30, 40, 50, 60, 70, 80, 90, 100, 200, 300, 400, 500, 600, 700, 800, 900, 1000, or a number or a range between any two of these values, Daltons.

Enzymes

The methods, compositions, and systems disclosed herein can be used to test different enzymes. In some embodiments, the enzymes can be, or can include, Enzyme Commission (EC) 1 oxidoreductases (e.g., a dehydrogenase or an oxidase), EC 2 transferases (e.g., a transaminase or a kinase), EC 3 Hydrolases (e.g., a lipase, an amylase, or a peptidase), EC 4 Lyases (e.g., a decarboxylase), EC 5 Isomerases (e.g., an isomerase or a mutase), or EC 6 Ligases (e.g., a synthetase). In some embodiments, the enzymes can be, or can include, a methyltransferase or a glycoside hydrolase. In some embodiments, the enzymes can be, or can include, a agarase, a aminidase, a amylase, a biosidase, a carrageenase, a cellulase, a ceramidase, a chitinase, a chitosanase, a citrinase, a dextranase, a dextrinase, a fructosidase, a fucoidanase, a fucosidase, a furanosidase, a galactosidase, a galacturonase, a glucanase, a glucosidase, a glucuronidase, a glucuronosidase, a glycohydrolase, a glycosidase, a hexaosidase, a hydrolase, an iduronidase, a inosidase, an inulinase, a lactase, a levanase, a licheninase, a ligase, a lyase, a lysozyme, a maltosidase, a maltotriosidase, a mannobiosidase, a mannosidase, a muramidase, an octulosonase, an octulosonidase, a primeverosidase, a protease, a pullulanase, a rhamnosidase, a saminidase, a sialidase, a synthase, a transferase, a trehalase, a turonidase, a turonosidase, a xylanase, or a xylosidase.

The number of enzymes tested can vary. In some embodiments, the number of enzymes tested can be, or be about, 1, 2, 3, 4, 5, 6, 7, 8, 9, 10, 20, 30, 40, 50, 60, 70, 80, 90, 100, 200, 300, 400, 500, 600, 700, 800, 900, 1000, $10^4$, $10^5$, $10^6$, $10^7$, $10^8$, $10^9$, or a number or a range between any two of these values. In some embodiments, the number of enzymes tested can be at least, or at most, 1, 2, 3, 4, 5, 6, 7, 8, 9, 10, 20, 30, 40, 50, 60, 70, 80, 90, 100, 200, 300, 400, 500, 600, 700, 800, 900, 1000, $10^4$, $10^5$, $10^6$, $10^7$, $10^8$, or $10^9$.

EXAMPLES

Example 1

Lanthanide—Chelator Preparation

This example demonstrates preparation of lanthanide-chelators by solubilizing lanthanides in 6M HCl prior to reacting to chelators in an ammonium acetate solution.

Purified lanthanide isotopes were dissolved in 6 M HCl for 1 day at 50° C. at a concentration of 100 mM. The chelator molecule, 2,2',2''-(10-(24(5-aminopentyl)amino)-2-oxoethyl)-1,4,7,10-tetraazacyclododecane-1,4,7-triyl)triacetic acid, abbreviated as DOTA-NH, was stored at 100 mM in deionized water. Lanthanides and chelators were reacted at 20 mM (1 to 1 molar ratio) in an ammonium acetate solution (pH 4.3) for 30 minutes at 80° C. After the reaction, the lanthanide-chelator solution was frozen in liquid nitrogen and then lyophilized overnight. Prior to use, the lanthanide-chelator molecule was solubilized at 100 mM in deionized water.

Altogether, these data demonstrates the preparation of lanthanide-chelator complexes.

Example 2

Detection Lanthanide—Chelator Complexes

This example demonstrates detection of lanthanide-chelator complexes using mass spectrometry.

FIGS. 2A-B are non-limiting exemplary mass spectra of lanthanide-chelator complexes. Lanthanide-DOTA-NH complexes were detected in positive mode matrix assisted laser desorption ionization (MALDI) MS on an ABSciex 4800 for lanthanide isotopes, including Europium (Eu153), Dysprosium (Dy164), Ytterbium (Yb173, Yb174, and Yb176), and Lutetium (Lu175). These lanthanide isotopes were undetectable in MALDI MS without a chelator present. With the addition of the chelator DOTA-NH, the lanthanide-chelator complexes were detected at the expected m/z of 639.32, 650.33, 659.33, 660.33, 662.34, or 661.34 for the complexes, respectively.

Lanthanide-chelator complexes could be distinguished along with other metabolites in solution. In the presence of a highly abundant metabolite that suppressed ionization in MALDI MS, the readouts of all lanthanide-chelator complexes were similarly attenuated.

This demonstrates that lanthanide-chelator complexes can be detected using mass spectrometry.

Example 3

2D Combinatorial Space

This example demonstrates a linear dose-response of lanthanide-chelator complexes (relative to a lanthanide-chelator complex used as an internal standard) over two orders of magnitude in concentration, thus simplifying quantification.

FIGS. 3A-C are non-limiting exemplary figures showing similar relative mass spectrometry intensities of lanthanide-chelator complexes at different concentrations. FIG. 3A is a non-limiting exemplary mass spectrum showing the simultaneous readouts of three lanthanide-DOTA-NH complexes. The lanthanides in the three lanthanide-DOTA-NH complexes were Yb173, Yb174, and YB176.

FIG. 3B panels a-c are bar charts showing non-limiting exemplary relative peak intensities of Yb173, Yb174 and Yb176 to the peak intensity of Yb176 for samples, i.e. the peak intensities of Yb173, Yb174 and Yb176 normalized to the peak intensity of Yb176. Samples with three different lanthanide-DOTA-NH complexes were generated and analyzed by mass spectrometry. The three lanthanides used were Yb173, Yb174, and Yb176. Yb173 was at 0.5 mM for all samples. The samples contained concentrations of 0 mM (first bar from the right in each panel), 0.1 mM (second bar from the right in each panel), 0.2 mM (third bar from the right in each panel), 0.5 mM (fourth bar from the right in each panel), 1 mM (fifth bar from the right in each panel), 2 mM (sixth bar from the right in each panel), 5 mM (seventh bar from the right in each panel), and 10 mM (eighth bar from the right in each panel) for Yb174. Yb176 was used as the internal standard and was at 1 mM in all samples. Each sample was added to a matrix-assisted laser desorption/ionization (MALDI) target plate (400 nL), and mixed with 400 nL of the MALDI matrix 20 g/L 2,5-dihydroxybenzoic acid (50% ethanol) and allowed to dry. MALDI was performed using an AB SCIEX 4800 mass spectrometer. For each location sample was analyzed, the lanthanide-chelators mass spectrometry intensities were normalized by the relative signal of the Yb176 molecule. FIG. 3B panel a shows non-limiting exemplary bar charts demonstrating the relative intensities of Yb173 at 0.5 mM to Yb176 at 1 mM were very similar for different concentrations of Yb174. FIG. 3B panel b shows non-limiting bar charts demonstrating that the relative intensities of Yb174 to Yb176 at 1 mM increased linearly at Yb174 concentrations ranging from 0.1 mM to 10 mM, i.e. two orders of magnitude difference in Yb174 concentration. FIG. 3B panel c shows non-limiting exemplary bar charts demonstrating that the intensities of Yb176 normalized to itself were constant at different Yb174 concentrations. FIG. 3B panels a-b demonstrate that the relative intensities of the lanthanide-chelator signals can be used to describe the relative abundance of the lanthanide-chelator complexes.

FIG. 3C shows a non-limiting exemplary log-log scatter plots of the relative intensity (normalized by Yb176) for Yb173 on the X axis and Yb174 on the Y axis. The labels on the X and Y axis indicate the relative concentration of the Yb173 and Yb174 of for the corresponding data points. Similarly located spots were replicates. FIG. 3C demonstrates reliable tracking of relative lanthanide-chelator complex conditions.

Altogether, these data demonstrates the relative intensities of lanthanide-chelator complexes can be used for tracking liquid solutions (e.g., reaction conditions in solutions) over a range MS conditions because of the comparable ionization and detection characteristics of the complexes.

Example 4

Similar Relative Intensity of Lanthanide-Chelator Complexes Over Different in Mass Spectrometry Conditions This example demonstrates similar relative intensities of lanthanide-DOTA-NH complexes over different mass spectrometry conditions by normalizing the mass spectrometry (MS) peak readouts of Erbium (Er) 166, 170 and 172 normalized to the MS readout of Er168.

Figure 4A:
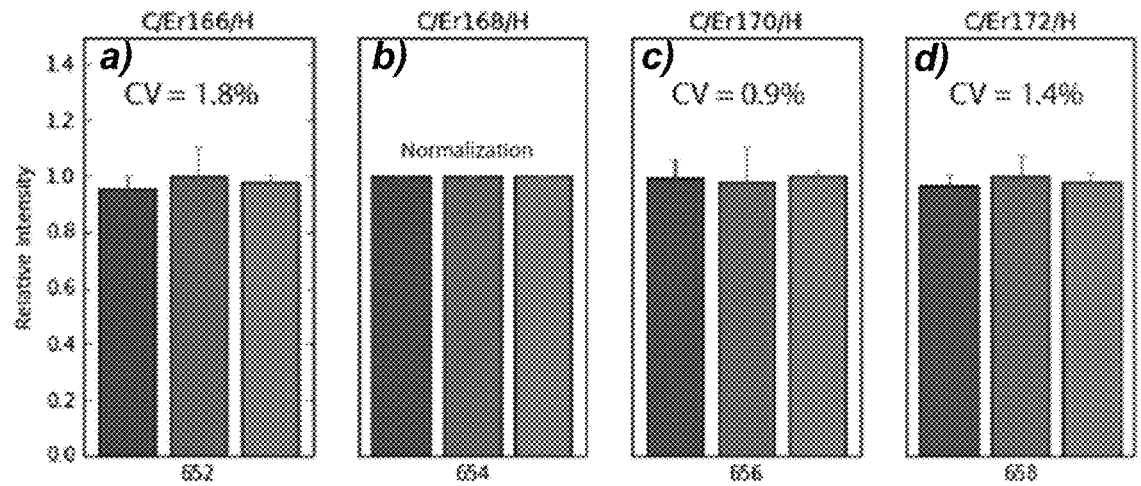
FIGS. 4A-B are non-limiting exemplary bar charts showing similar relative mass spectrometry (MS) intensities of lanthanide-chelator complexes at different conditions and different relative intensities of amino acids at different conditions.
Figure 4B:
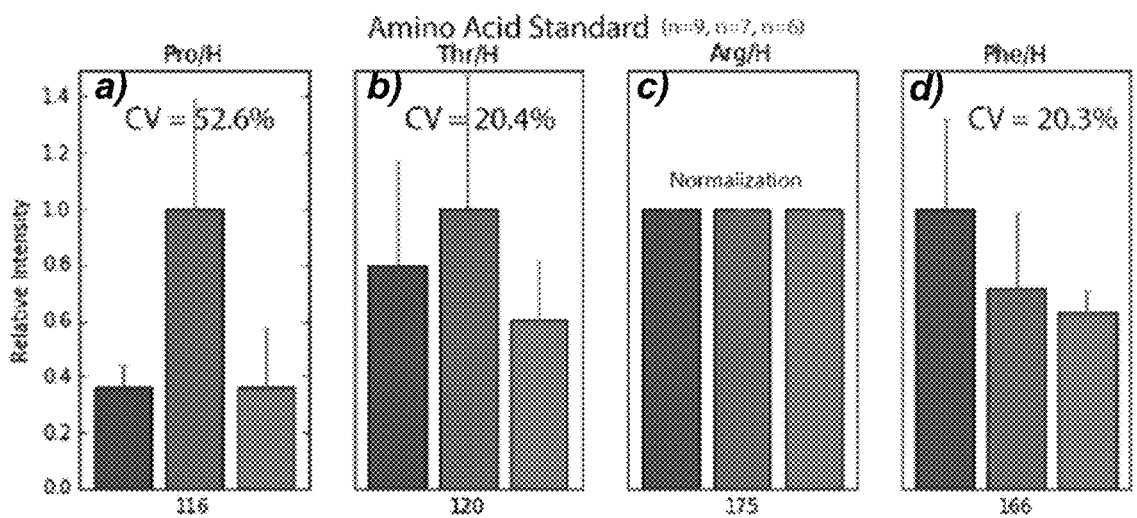

FIGS. 4A-B are non-limiting exemplary bar charts showing similar relative mass spectrometry (MS) intensities of lanthanide-chelator complexes at different conditions and different relative intensities of amino acids at different conditions. A stock sample solution contained 2.5 mM Proline, Threonine, Arginine, Phenylalanine and lanthanide-chelator complexes with Erbium (Er) 166, 168, 170 or 172 as the lanthanide. The sample was diluted 1:9 in 50 mM phosphate buffer (left bar in each panel of FIGS. 4A-B), 10 mg/mL polyethylene glycol with an average molecular weight of 8 kDa (middle bar in each panel of FIGS. 4A-B), or deionized water (right bar in each panel of FIGS. 4A-B). 400 nL of each sample was mixed with 400 nL of the MALDI matrix 20 g/L 2,5-dihydroxybenzoic acid (50% ethanol) and analyzed with an AB SCIEX 4800 mass spectrometer. The relative peak intensities of the lanthanide-chelators or amino acids were calculated by normalizing by Er173-DOTA-NH or Arginine, for the lanthanide-chelators and amino acids respectively.

FIG. 4A panels a-d are non-limiting exemplary bar charts showing similar relative intensities of lanthanide-chelator complexes at three different mass spectrometry conditions: the sample was diluted 1:9 in 50 mM phosphate buffer (left bar in each panel, n=15), 10 mg/mL polyethylene glycol with an average molecular weight of 8 kDa (middle bar in each panel, n=10), or deionized water (right bar in each panel, n=6). The peak CV over the three conditions reflects how relative ionization changes form one condition to the next. Lanthanide-Chelator complexes normalized to Er168 with Er166, Er168, Er170, or Er172 as the lanthanide and DOTA-NH as the chelator had coefficients of variation (CVs) of 1.8%, 0.9% and 1.4% respectively.

FIG. 4B panels a-d are non-limiting exemplary bar charts showing non-similar relative intensities of amino acids at the three different mass spectrometry conditions: the sample was diluted 1:9 in 50 mM phosphate buffer (left bar in each panel, n=9), 10 mg/mL polyethylene glycol with an average molecular weight of 8 kDa (middle bar in each panel, n=7), or deionized water (right bar in each panel, n=6). Amino Acids Proline, Threonine, and Phenylalanine had CVs of 52.6%, 20.4% and 20.3%, respectively.

Altogether, these data demonstrates similar relative intensities of lanthanide-DOTA-NH complexes over different mass spectrometry conditions.

Example 5

Lanthanide—Chelator Mapping for Reaction Optimization

This example demonstrates lanthanide-chelator mapping for reaction optimization for CelEcc_CBM3a and β-glucosidase for different substrates.

Figure 5:
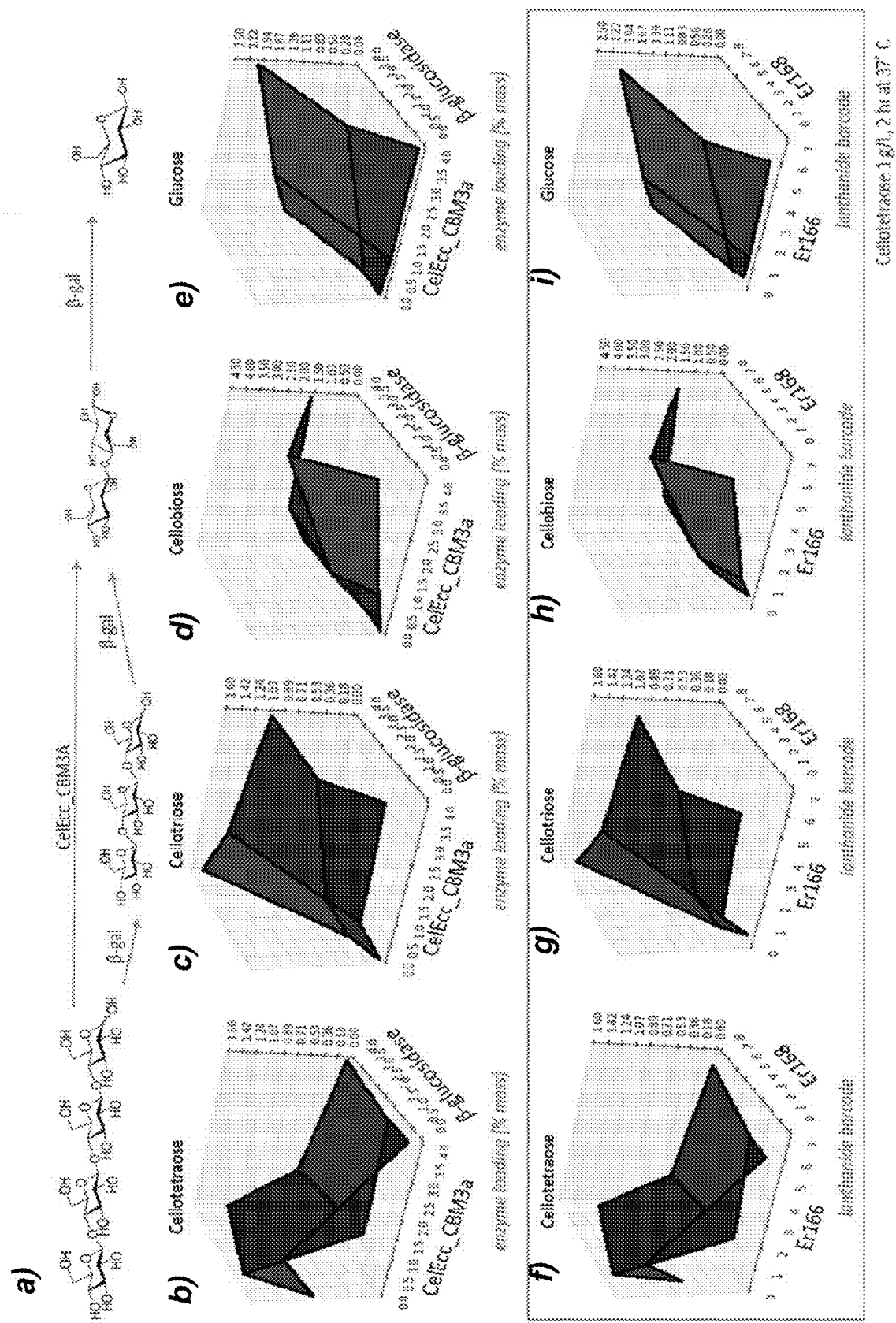
FIG. 5 shows a non-limiting example of lanthanide-chelator mapping for reaction optimization.

FIG. 5 shows a non-limiting example of lanthanide-chelator mapping for reaction optimization. Enzyme stock solutions of 0.1 g/L CelEcc_CBM3a and 0.1 g/L β-glucosidase in phosphate buffer (pH 5) were created with lanthanide-chelator complexes: 10 mM Er166-DOTA-NH and 10 mM Er168-DOTA-NH, respectively. The enzyme stock solutions were mixed to create nine distinct conditions, in a solution that contained 1 g/L Cellotetraose substrate and an internal standard of 1 mM Er172-DOTA-NH. All enzyme combinations were incubated at the concentrations of 0 mg/L, 10 mg/L, and 40 mg/L. The samples were incubated at 37° C. for 2 hours. 400 nL of each sample was mixed with 400 nL of the MALDI matrix 20 g/L 2,5-dihydroxybenzoic acid (50% ethanol) and analyzed with an AB SCIEX 4800 mass spectrometer.

FIG. 5 panel a shows the catalysis of substrates by CelEcc_CBM3a and β-glucosidase. FIG. 5 panels b-e are 3D plots showing the relative peak intensities normalized to Er172-DOTA-NH of the sodium adduct ion for the cellulose substrates: cellotetraose, cellotriose, cellobiose and glucose. The X and Y axis are the enzyme loading percentage (mass of enzyme/mass of substrate*100) for enzymes CelEcc_CBM3a and β-glucosidase, respectively.

FIG. 5 panels f-i are 3D plots showing the relative peak intensities normalized to Er172-DOTA-NH of the sodium adduct ion for the cellulose substrates: cellotetraose, cellotriose, cellobiose and glucose. The X and Y axis are the relative lanthanide-chelator complex intensities of Er166-DOTA-NH and Er168-DOTA-NH for each point, to approximate the relative enzyme concentrations. The similar morphology of FIG. 5 panels b-e and FIG. 5 panels f-i suggests that lanthanide-chelator complexes can be reliably used to track the composition of combinations.

Altogether, these data demonstrates that lanthanide-chelator complexes can be reliably used to track the composition of combinations.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of tracking reaction conditions in solutions, comprising:
    (a) labeling a first solution comprising a first enzyme with a first lanthanide-chelator complex to generate a first barcoded solution comprising the first enzyme labeled with the first lanthanide-chelator complex, wherein the first lanthanide-chelator complex comprises a first lanthanide chelated by a first chelator;
    (b) labeling a second solution comprising a first substrate with a second lanthanide-chelator complex to generate a second barcoded solution comprising the first substrate labeled with the second lanthanide-chelator complex, wherein the second lanthanide-chelator complex comprises a second lanthanide chelated by a second chelator,
        wherein the first enzyme is capable of carrying out an enzymatic reaction upon the first substrate under one or more conditions;
    (c) mixing the first barcoded solution and the second barcoded solution together to form two or more mixtures, wherein at least two of the two or more mixtures comprise different relative abundance of the first enzyme and/or the first substrate;
    (d) following the mixing in step (c), incubating the two or more mixtures under the one or more conditions for the first enzyme to carry out the enzymatic reaction upon the first substrate, wherein the enzymatic reaction generates one or more reaction products formed by the first enzyme acting upon the first substrate;
    (e) following the incubation in step (d), generating a mass spectrum of each of the at least two of the two or more mixtures, wherein the mass spectrum comprises the first lanthanide and the second lanthanide;

(f) identifying the first lanthanide in the mass spectrum and the second lanthanide in the mass spectrum of each of the at least two of the two or more mixtures, wherein identifying the first lanthanide in the mass spectrum and the second lanthanide in the mass spectrum comprises determining a ratio of the peak intensity of the first lanthanide to the peak intensity of the second lanthanide in the mass spectrum of each of the at least two of the two or more mixtures; and (g) determining a relative abundance of the first enzyme and the first substrate in each of the at least two of the two or more mixtures formed in step (c), wherein the relative abundance of the first enzyme and the first substrate in each of the at least two of the two or more mixtures formed in step (c) is determined as linearly correlated to the ratio of the peak intensity of the first lanthanide to the peak intensity of the second lanthanide in the mass spectrum of each of the at least two of the two or more mixtures.

2. The method of claim 1, wherein the first lanthanide or the second lanthanide are selected from the group consisting of: Cerium 136, Cerium 138, Cerium 140, Praseodymium 141, Cerium 142, Neodymium 142, Neodymium 143, Neodymium 144, Samarium 144, Neodymium 145, Neodymium 146, Samarium 147, Neodymium 148, Samarium 149, Samarium 150, Europium 151, Samarium 152, Europium 153, Gadolinium 154, Samarium 154, Gadolinium 155, Dysposium 156, Gadolinium 156, Gadolinium 157, Dysposium 158, Gadolinium 158, Terbium 159, Dysposium 160, Gadolinium 160, Dysposium 161, Dysposium 162, Erbium 162, Dysposium 163, Dysposium 164, Erbium 164, Holmium 165, Erbium 166, Erbium 167, Erbium 168, Ytterbium 168, Thulium 169, Erbium 170, Ytterbium 170, Ytterbium 171, Ytterbium 172, Ytterbium 173, Ytterbium 174, Lutetium 175, Ytterbium 176, and any combination thereof.

3. The method of claim 1, wherein the first chelator or the second chelator is 2,2',2"-(10-(2-((5-aminopentyl)amino)-2-oxoethyl)-1,4,7,10-tetraazacyclododecane-1,4,7-triyl)triacetic acid.

4. The method of claim 1, wherein the first lanthanide and the second lanthanide are different, and the first chelator and the second chelator are the same.

5. The method of claim 1, further comprising:
labeling a third solution with a third lanthanide-chelator complex to generate a third barcoded solution, wherein the third lanthanide-chelator complex comprises a third lanthanide chelated by a third chelator,
wherein mixing the first barcoded solution and the second barcoded solution to form the two or more mixtures comprises mixing the first barcoded solution, the second barcoded solution, and the third barcoded solution to form the two or more mixtures; and
identifying the third lanthanide in the mass spectrum to track the reaction condition of the each of the two or more mixtures.

6. The method of claim 5, wherein the first barcoded solution comprises a first enzyme, wherein the second barcoded solution comprises a first substrate, wherein the first enzyme is incubated with the first substrate in the two or more mixtures, wherein the third solution comprises a second enzyme, and wherein the second enzyme is incubated with the first substrate in the two or more mixtures.

7. The method of claim 5, wherein the first barcoded solution comprises a first enzyme, wherein the second barcoded solution comprises a first substrate, wherein the first enzyme is incubated with the first substrate in the two or more mixtures, wherein the third solution comprises a second substrate, and wherein the first enzyme is incubated with the second substrate in the two or more mixtures.

8. The method of claim 5, wherein identifying the first lanthanide, the second lanthanide, and the third lanthanide in the mass spectrum comprises determining the ratio of the first lanthanide to the second lanthanide and the ratio of the third lanthanide to the second lanthanide.

9. The method of claim 1, wherein the two or more mixtures comprise at least 1000 mixtures.

10. The method of claim 1, wherein at least one of the two or more mixtures has a volume selected from the group consisting of about 1 microliter, about 1 nanoliter, and about 1 picoliter.

11. The method of claim 1, wherein the mass spectrum is generated using soft ionization mass spectrometry (MS).

12. The method of claim 1, wherein the mass spectrum is generated using a mass spectrometry technique selected from the group consisting of electrospray ionization MS (ESI-MS), liquid chromatography ESI-MS, nanostructure-initiator MS, fast atom bombardment MS, chemical ionization MS, atmospheric-pressure chemical ionization MS, matrix-assisted laser desorption/ionization MS, and any combination thereof.

13. The method of claim 1, wherein the first lanthanide-chelator complex and the second lanthanide-chelator complex serve as internal standards.

14. The method of claim 1, wherein the first chelator or the second chelator is one of ethylenediaminetetraacetic acid, 1,4,7,10-tetraazacyclododecane-1,4,7,10-tetraacetic acid, and diethylenetriaminepentaacetic acid.

* * * * *